US012762396B2

(12) United States Patent
Yanagisawa et al.

(10) Patent No.: US 12,762,396 B2
(45) Date of Patent: Oct. 13, 2026

(54) TRAINING A NEURAL NETWORK PREDICTION MODEL FOR SURVIVAL ANALYSIS

(71) Applicant: INTERNATIONAL BUSINESS MACHINES CORPORATION, Armonk, NY (US)

(72) Inventors: Hiroki Yanagisawa, Kawasaki (JP); Toshiya Iwamori, Tokyo (JP); Akira Koseki, Yokohama (JP); Michiharu Kudo, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 17/887,349

(22) Filed: Aug. 12, 2022

(65) Prior Publication Data

US 2024/0054334 A1 Feb. 15, 2024

(51) Int. Cl.
*G06N 3/08* (2023.01)

(52) U.S. Cl.
CPC .................................... *G06N 3/08* (2013.01)

(58) Field of Classification Search
CPC ........... G06N 3/08; G06N 3/00–99/007; Y10S 706/00–706/934
See application file for complete search history.

(56) References Cited

U.S. PATENT DOCUMENTS

| | | | | |
|---|---|---|---|---|
| 10,650,929 | B1 * | 5/2020 | Beck | G06N 3/0464 |
| 2004/0010481 | A1 * | 1/2004 | Mani | G06N 3/049 706/21 |
| 2005/0197982 | A1 * | 9/2005 | Saidi | G06N 3/084 706/21 |
| 2020/0211716 | A1 * | 7/2020 | Lefkofsky | G06F 18/214 |
| 2020/0267580 | A1 * | 8/2020 | Gray | H04W 64/003 |
| 2021/0142910 | A1 * | 5/2021 | Hafez | G16H 20/40 |
| 2021/0149786 | A1 * | 5/2021 | Salkeld | G06N 3/0455 |

(Continued)

FOREIGN PATENT DOCUMENTS

RU 2438127 C1 12/2011

OTHER PUBLICATIONS

Gensheimer, M.F. et al., "A scalable discrete-time survival model for neural networks," PeerJ, Jan. 25, 2019, vol. 7, e6257, 19 pg.

(Continued)

*Primary Examiner* — Courtney D Heinle
(74) *Attorney, Agent, or Firm* — CHIP LAW GROUP

(57) ABSTRACT

A computer-implemented process for training a prediction model for survival analysis includes the following operations. A batch of data is elected from a training dataset representing a plurality of individuals. A curve representing a survival rate of a group of individuals within the batch over a period of time is generated using a non-parametric statistical function and for the batch of data. Individual survival functions for each individual within the batch are estimated using the prediction model. An average survival function is generated from the individual survival functions. A calibration loss is generated using the curve representing the survival rate and the average survival function. Weight of a neural network including the prediction model are updated based upon a total loss including the calibration loss.

20 Claims, 8 Drawing Sheets

(56) References Cited

U.S. PATENT DOCUMENTS

| | | | | |
|---|---|---|---|---|
| 2021/0150379 | A1* | 5/2021 | Wang | G06N 20/00 |
| 2021/0150396 | A1* | 5/2021 | Wang | G06N 20/00 |
| 2021/0150397 | A1* | 5/2021 | Salkeld | G06N 7/01 |
| 2023/0154627 | A1* | 5/2023 | Irving | G06N 3/088 706/20 |
| 2023/0359882 | A1* | 11/2023 | Yanagisawa | G06F 18/214 |
| 2025/0006313 | A1* | 1/2025 | Nicoludis | G06N 20/00 |
| 2025/0166723 | A1* | 5/2025 | Gujral | G16B 25/10 |

OTHER PUBLICATIONS

Avati, A. et al., "Countdown Regression: Sharp and Calibrated Survival Predictions," In Uncertainty in Artificial Intelligence, Aug. 6, 2020, pp. 145-155, PMLR.

Guo, C. et al., "On Calibration of Modern Neural Networks," In International Conference on Machine Learning, Jul. 17, 2017, pp. 1321-1330, PMLR.

Lee, C. et al., "DeepHit: A Deep Learning Approach to Survival Analysis With Competing Risks," In Proceedings of the AAAI Conference on Artificial Intelligence, Apr. 26, 2018, vol. 32, No. 1, 8 pg.

Tjandra, D.E. et al., "A Hierarchical Approach to Multi-Event Survival Analysis," In Proceedings of the AAAI Conference on Artificial Intelligence, May 18, 2021, vol. 35, No. 1, pp. 591-599.

Kamran, F. et al., "Estimating Calibrated Individualized Survival Curves with Deep Learning," In Proceedings of the AAAI Conference on Artificial Intelligence, May 18, 2021, vol. 35, No. 1, pp. 240-248.

Haider, H. et al., "Effective Ways to Build and Evaluate Individual Survival Distributions," Journal of Machine Learning Research, Jan. 1, 2020, vol. 21, No. 85, pp. 1-63.

Ren, K. et al., "Deep Recurrent Survival Analysis," In Proceedings of the AAAI Conference on Artificial Intelligence, Jul. 17, 2019, vol. 33, No. 01, pp. 4798-4805.

Goldstein, M. et al., "X-CAL: Explicit Calibration for Survival Analysis," Advances in Neural Information Processing Systems (NeruIPS), 2020; vol. 33, pp. 18296-307.

Wang, P. et al., "Machine Learning for Survival Analysis: A Survey," ACM Computing Surveys (CSUR), vol. 51, No. 6, Feb. 27, 2019, pp. 1-36.

Chapfuwa, P. et al., "Survival function matching for calibrated time-to-event predictions," arXiv preprint, arXiv:1905.08838. May 21, 2019.

Mell, P. et al., The NIST Definition of Cloud Computing, National Institute of Standards and Technology, U.S. Dept. of Commerce, Special Publication 800-145, Sep. 2011, 7 pg.

* cited by examiner

Dataset: flchain

Dataset: support

Proposed method

| | Lambda=0.1 | Lambda=1 | Lambda=10 |
|---|---|---|---|
| D-CAL | 0.007 | 0.005 | 0.005 |
| KMLoss | 0.507 | 0.163 | 0.033 |
| NLL | 1.264 | 1.241 | 1.233 |
| c-index | 0.723 | 0.698 | 0.498 |

X-CAL

| | Lambda=0.1 | Lambda=1 | Lambda=10 |
|---|---|---|---|
| D-CAL | 0.008 | 0.007 | 0.004 |
| KMLoss | 0.637 | 0.552 | 0.245 |
| NLL | 1.271 | 1.270 | 1.284 |
| c-index | 0.727 | 0.728 | 0.697 |

FIG. 7A

Proposed method

| | Lambda=0.1 | Lambda=1 | Lambda=10 |
|---|---|---|---|
| D-CAL | 0.039 | 0.033 | 0.021 |
| KMLoss | 0.188 | 0.140 | 0.053 |
| NLL | 1.377 | 1.378 | 1.351 |
| c-index | 0.671 | 0.667 | 0.562 |

X-CAL

| | Lambda=0.1 | Lambda=1 | Lambda=10 |
|---|---|---|---|
| D-CAL | 0.039 | 0.031 | 0.017 |
| KMLoss | 0.190 | 0.132 | 0.047 |
| NLL | 1.376 | 1.387 | 1.467 |
| c-index | 0.670 | 0.669 | 0.270 |

FIG. 7B

TRAINING A NEURAL NETWORK PREDICTION MODEL FOR SURVIVAL ANALYSIS

BACKGROUND

The present invention relates to machine learning, and more specifically, to training a neural network prediction model for survival analysis using an improved regularization term.

Survival analysis is a field of computer science and statistics that involves predicting a duration of time until a particular event occurs. As the name implies, 'survival analysis' initially began as a technique used to determine the predicted expiration of a biological organism based upon characteristics of this organism. However, survival analysis is not limited in this manner. For example, survival analysis can be used to predict a failure in a mechanical system (e.g., a hard drive fails) as part of engineering reliability analysis. As another example, survival analysis can be used by an internet provider to predict when a customer may terminate a contract.

Aspects of survival analysis can be described with regard to FIG. 1. A dataset D={(x1, z1, d1), (x2, z2, d2), . . . , (xn, zn, dn)} is provided as an input where: xi represents a feature vector for a patient (or object), zi represents the time of event (ti) or the censored time (ci), and the binary indicator (di) represents whether zi is uncensored (di=1) or censored (di=0). A censored data point (i.e., a data point with di=0) means that the exact time of the event (ti) is unknown, and the only thing that is known is that ti>=ci.

The censored time (ci) represents the time after which observation has ended (e.g., after the end of the study). By way of example, if the dataset included hard drives that were observed over a 5 year period, and one of the hard drives failed/expired 3 months after the observation had concluded (i.e., after the censored time), then this data point would be censored (i.e., di=0). Another phrase used to describe such an event is that the event was "right-censored." Other types of right-censored events occur when the patient withdraws from the study or is lost to follow-up. A "left-censored" event is one in which failure/expiration occurs prior to the start of the study. In this instance, the "birth event" occurs prior to the start of the study, and consequently, a timer may not be started. Accordingly, these types of events are usually excluded from the dataset. What constitutes a "birth event" can vary depending upon what is being studied. For example, in a medical context, a birth event may be when a patient enters the hospital. In an engineering context, a birth event may be when a product is installed or otherwise placed into operation.

A prediction model, used as part of machine learning including, for example, neural networks, is trained to estimate a survival rate S(t|x) of a patient x, where S(t|x) reflects the probability of the event occurring (or not) over time t. An exemplary technique for survival analysis is a Kaplan-Meier estimator, and an example of a chart generated thereby is illustrated in FIG. 1B.

A Kaplan-Meier estimator is a non-parametric methodology. Advantageously, a Kaplan-Meier estimator can account for certain types of censored data, particularly right-censored data. An aspect of a Kaplan-Meier estimator is that the technique is used to estimate the average survival rate S(t) over patients as opposed to estimate a survival rate S(t|x) for an individual patient. Other examples of non-parametric estimators are Nelson-Aalen and Life-Table. A Cox model (and variations thereof) are an example of a semi-parametric model. Examples of parametric models include Tobit, Buckley-James, penalized regression, and Accelerated Failure Time.

Referring to FIGS. 2A and 2B, when a neural network is used to estimate the survival functions S(t|x) for patients, it is anticipated their average survival rate S(t) would be close to the Kaplan-Meier curve k(t). However, in many instances, the average of the survival rates S(t) estimated by a neural network prediction model is very different from the Kaplan-Meier curve k(t). Consequently, the neural network prediction model is deemed to be miscalibrated.

One approach to improving neural network models is to employ "regularization." Regularization involves modifying a learning model to favor "simpler" prediction rules so as to avoid overfitting. In many instances, regularization modifies the loss function to penalize certain values of weight being learned—in particular weights that are large. One known approach to improve a prediction model for survival analysis is referred to as distributional-calibration (oftentimes abbreviated as D-CAL). This technique computes the squared difference between observed and predicted number of events with different time intervals. However, D-CAL is not differentiable and cannot be used as the regularization term in a loss function of a neural network. As an alternative to D-CAL, explicit calibration (or X-CAL) has been proposed which approximates D-CAL by replacing a step function with a sigmoid function. Notably, X-CAL is differentiable, which means it can be used as the regularization term in the loss function.

In D-CAL and X-CAL, F(t|x) is estimated when censored data is present, where F(t|x) (i.e., cumulative distribution function)=1−S(t|x). F(t|x) represents the probability of observing the event by time t for x, and the survival function S(t|x) represents the probability of not-observing the event until time t for x. D-CAL and X-CAL require all possible values of F(t|x) for $t \in |0, \infty|$ to compute a distance to the uniform distribution. Accordingly, there is a need to improve prediction models for survival analysis without employing a step function and to provide a simpler loss function for calibration.

SUMMARY

A computer-implemented process for training a prediction model for survival analysis includes the following operations. A batch of data is elected from a training dataset representing a plurality of individuals. A curve representing a survival rate of a group of individuals within the batch over a period of time is generated using a non-parametric statistical function and for the batch of data. Individual survival functions for each individual within the batch are estimated using the prediction model. An average survival function is generated from the individual survival functions. A calibration loss is generated using the curve representing the survival rate and the average survival function. Weight of a neural network including the prediction model are updated based upon a total loss including the calibration loss.

In other aspects of the process, the non-parametric statistical function can be a Kaplan-Meier estimator. The total loss is a function of the calibration loss and a selected loss function, and total loss is differentiated to obtain gradients whereby the weights are updated based upon the gradients.

The updating the weights of the neural networks is performed for a plurality of batches of the training dataset. The calibration loss l is calculated as $$l = \int_0^{tmax} d(S(t), k(t))dt,$$

where tmax is a maximum time of uncensored data points in the dataset, S(t) is the average survival function, and k(t) is the curve representing the survival rate of the group of individuals within the batch over the period of time, and d is the distance between S(t) and k(t). In certain aspects, the prediction model predicts failure occurrence of a particular type of manmade device, and the plurality of individuals are a plurality of the particular type of manmade device. In certain other aspects, prediction model predicts mortality of a particular type of biological organism, and the plurality of individuals are a plurality of the particular type of biological organism.

A computer hardware system for training a prediction model for survival analysis includes a hardware processor configured to perform the following executable operations. A batch of data is elected from a training dataset representing a plurality of individuals. A curve representing a survival rate of a group of individuals within the batch over a period of time is generated using a non-parametric statistical function and for the batch of data. Individual survival functions for each individual within the batch are estimated using the prediction model. An average survival function is generated from the individual survival functions. A calibration loss is generated using the curve representing the survival rate and the average survival function. Weight of a neural network including the prediction model are updated based upon a total loss including the calibration loss.

In other aspects of the hardware system, the non-parametric statistical function can be a Kaplan-Meier estimator. The total loss is a function of the calibration loss and a selected loss function, and total loss is differentiated to obtain gradients whereby the weights are updated based upon the gradients. The updating the weights of the neural networks is performed for a plurality of batches of the training dataset. The calibration loss l is calculated as $$l = \int_0^{tmax} d(S(t), k(t))dt,$$

where tmax is a maximum time of uncensored data points in the dataset, S(t) is the average survival function, k(t) is the curve representing the survival rate of the group of individuals within the batch over the period of time, and d is the distance between S(t) and k(t). In certain aspects, the prediction model predicts failure occurrence of a particular type of manmade device, and the plurality of individuals are a plurality of the particular type of manmade device. In certain other aspects, prediction model predicts mortality of a particular type of biological organism, and the plurality of individuals are a plurality of the particular type of biological organism.

A computer program product includes a computer readable storage medium having stored therein program code for training a prediction model for survival analysis. The program code, which when executed by a computer hardware system, cause the computer hardware system to perform the following. A batch of data is elected from a training dataset representing a plurality of individuals. A curve representing a survival rate of a group of individuals within the batch over a period of time is generated using a non-parametric statistical function and for the batch of data. Individual survival functions for each individual within the batch are estimated using the prediction model. An average survival function is generated from the individual survival functions. A calibration loss is generated using the curve representing the survival rate and the average survival function. Weight of a neural network including the prediction model are updated based upon a total loss including the calibration loss.

In other aspects of the computer program product, the non-parametric statistical function can be a Kaplan-Meier estimator. The total loss is a function of the calibration loss and a selected loss function, and total loss is differentiated to obtain gradients whereby the weights are updated based upon the gradients. The updating the weights of the neural networks is performed for a plurality of batches of the training dataset. The calibration loss l is calculated as l=

$$\int_0^{tmax} d(S(t), k(t))dt,$$

where tmax is a maximum time of uncensored data points in the dataset, S(t) is the average survival function, and k(t) is the curve representing the survival rate of the group of individuals within the batch over the period of time, and d is the distance between S(t) and k(t). In certain aspects, the prediction model predicts failure occurrence of a particular type of manmade device, and the plurality of individuals are a plurality of the particular type of manmade device. In certain other aspects, prediction model predicts mortality of a particular type of biological organism, and the plurality of individuals are a plurality of the particular type of biological organism.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIGS. 7A and 7B are tables of calibration and prediction metrics associated, respectively, with two different training datasets.

DETAILED DESCRIPTION

A computer-implemented process for training a prediction model for survival analysis includes the following operations. A batch of data is elected from a training dataset representing a plurality of individuals. A curve representing a survival rate of a group of individuals within the batch over a period of time is generated using a non-parametric statistical function and for the batch of data. Individual survival functions for each individual within the batch are estimated using the prediction model. An average survival function is generated from the individual survival functions. A calibration loss is generated using the curve representing the survival rate and the average survival function. Weight of a neural network including the prediction model are updated based upon a total loss including the calibration loss.

Figure 1A:
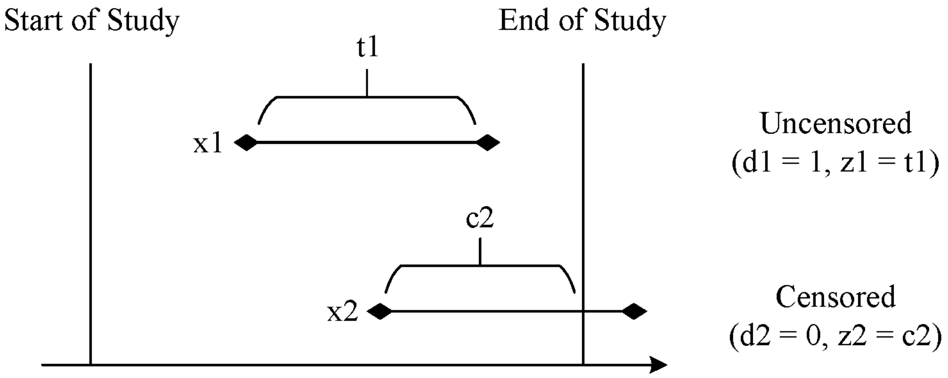
FIG. 1A are 1B are respectively a graphical representation of data points in a survival analysis study, and a graphical representation of a Kaplan-Meier curve k(t).
Figure 1B:
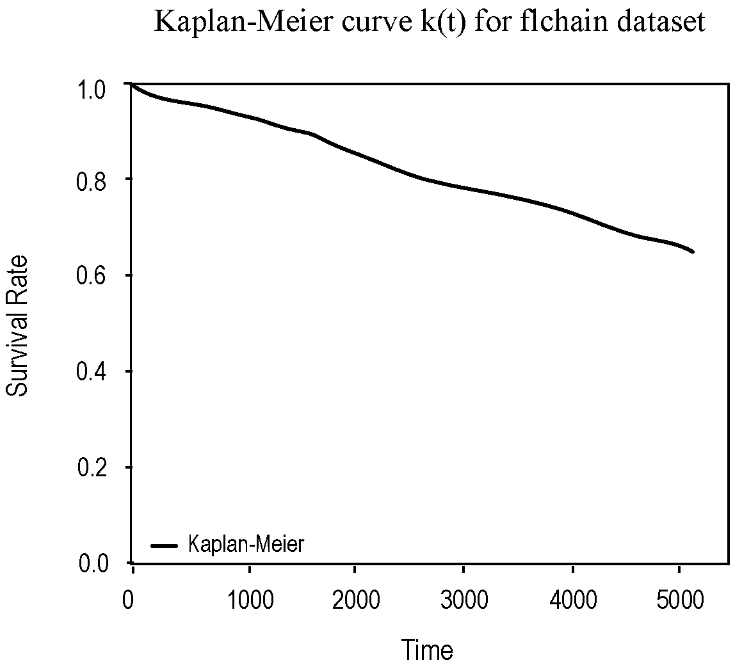
Figure 2A:
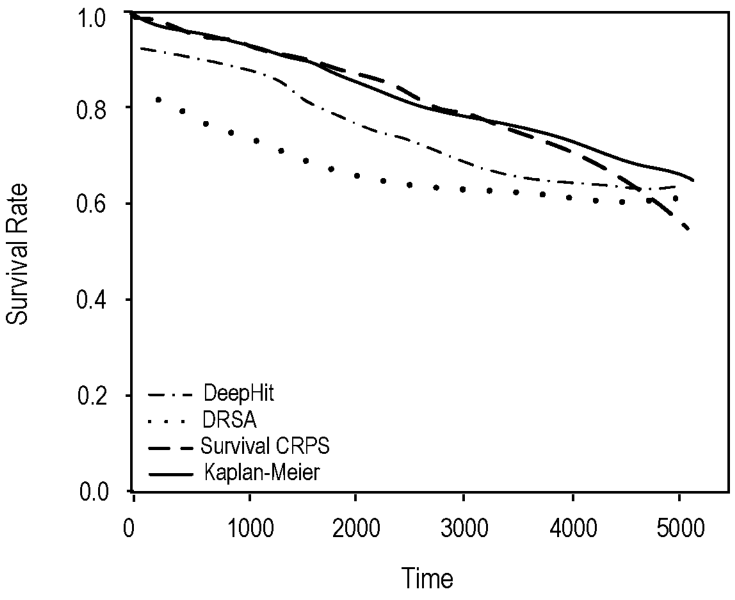
FIGS. 2A and 2B are graphical illustrations showing how different neural network models can be miscalibrated with the Kaplan-Meier curve, respectively, with two different training datasets.
Figure 2B:
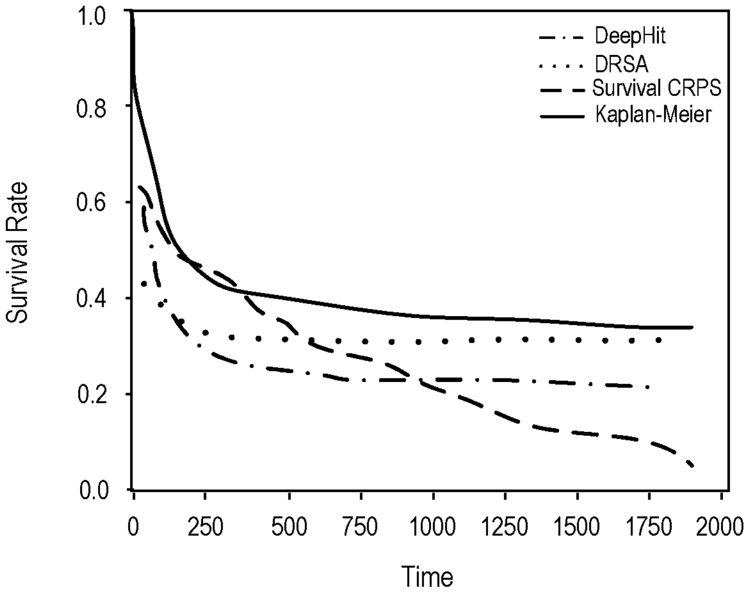
Figure 3:
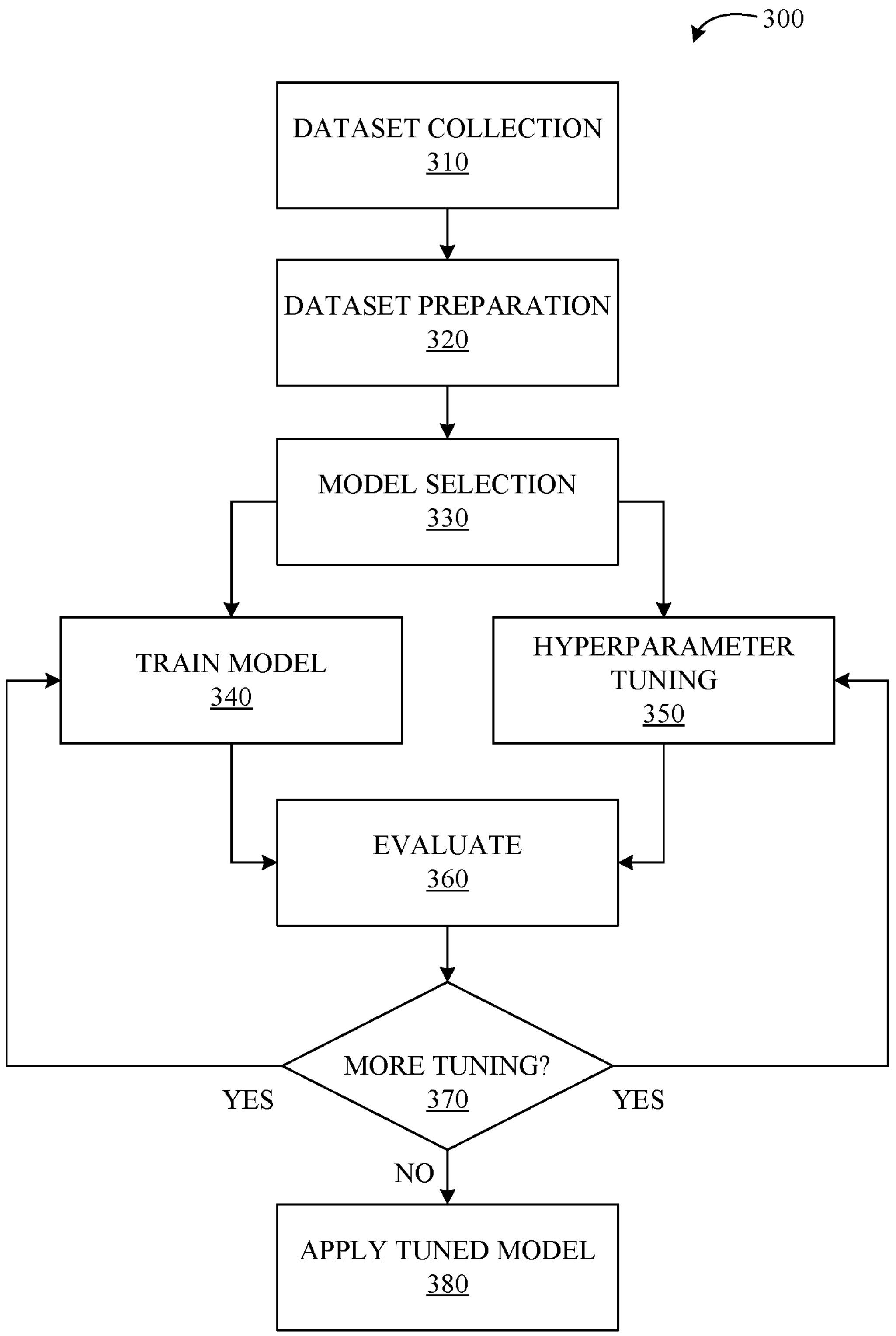
FIG. 3 is a flowchart of a typical reinforced learning (RL) approach.

With reference to FIG. 3, a generic process 300 for machine learning is disclosed. In 310, the data used for the dataset is collected. As conventionally known, the quality of the machine learning model (e.g., a neural network) being trained is dependent upon the quantity and quality of the data in the dataset. In 320, the data in the dataset is prepared, and this may involve a wide variety of different operations. For example, if the data comes from different sources, the data may require normalization and data type conversions. Also, duplicate data may be removed and errors/omissions in the data may be corrected. The data can also be randomized to reduce the impact of the particular order in which the data is collected and/or prepared.

The dataset can also be split up into multiple portions. One portion of the dataset (referred to herein as the training dataset), which is typically the largest portion, is used to train the model (e.g., tune the parameters of the model). Another portion of the dataset (referred to herein as the test dataset) is used to validate the final trained model. Still another portion of the dataset (referred to herein as the validation dataset) is used to tune hyperparameters. In certain instances, K-fold cross-validation can be used as part of model training.

In 330, the model to be trained is selected. There are a number of known models that can be used with machine learning. A non-exclusive list of these models includes linear regression, Deep Neural Networks (DNN), logistic regression, and decision trees. Depending upon the type of solution needed for a particular application, one or more models may be better suited.

In 340, the parameters of the model are tuned. There are many different types of known techniques used to train a model. Some of these techniques are discussed in further detail with regard to FIGS. 4A-4B. A particular approach to training a survival model is discussed in further detail with regard to FIG. 5. In 350, hyperparameters can be tuned. Hyperparameters are variables that govern the training process itself and differ from input data (i.e., the training data) and the parameters of the model. Examples of hyperparameters include, for example, the number of hidden layers in a DNN between the input layer and the output layer. Other examples include number of training steps, learning rate, and initialization values. In certain instances, the validation dataset can be used as part of this tuning process. Although illustrated as being separate from the tuning of the parameters of model in 350, the tuning of the hyperparameters can be performed in parallel with or in series with the tuning of the parameters of the model in 340.

In 360, the parameters of the model and the hyperparameters are evaluated. This typically involves using some metric or combination of metrics to generate an objective descriptor of the performance of the model. The evaluation typically uses data that has yet to be seen by the model (e.g., the test dataset). The operations of 340-360 continue until a determination, in 370, that no additional tuning is to be performed. In 380, the tuned model can then be applied to real-world data.

Figure 4A:
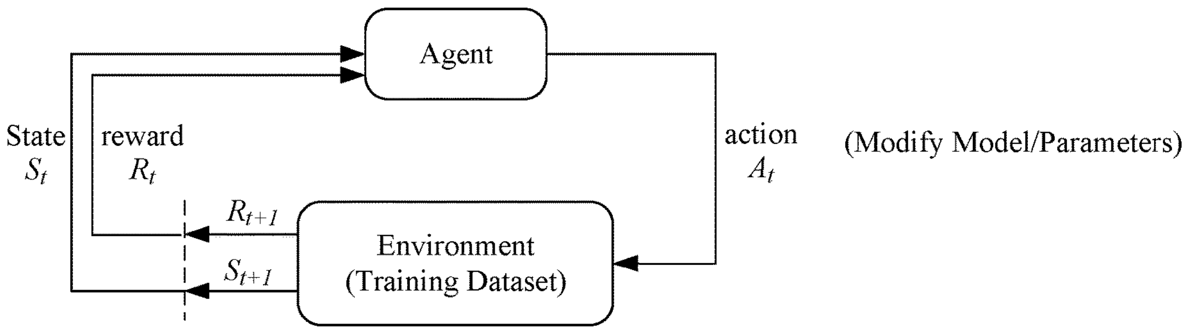
FIGS. 4A and 4B are block diagrams respectively schematically illustrating a reinforced learning (RL) approach and a deep Q-learning approach (DQN).
Figure 4B:
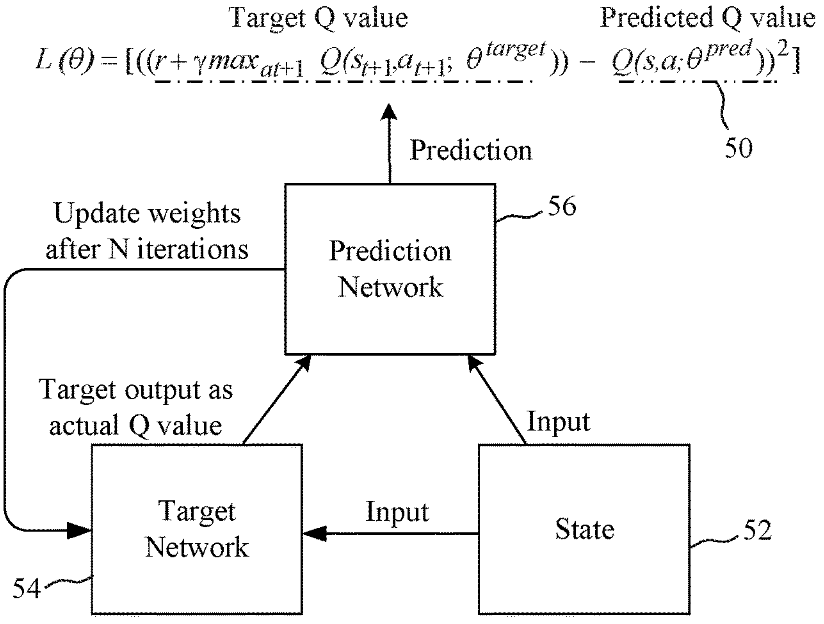

FIGS. 4A and 4B are block diagrams respectively illustrating a reinforced learning (RL) approach and a deep Q-learning approach (DQN) for training a model. Machine learning paradigms include supervised learning (SL), unsupervised learning (UL), and reinforced learning (RL). RL differs from SL by not requiring labeled input/output pairs and not requiring sub-optimal actions to be explicitly corrected. FIG. 4A schematically illustrates a generic RL approach. In describing RL, the following terms are oftentimes used. The "environment" refers to the world in which the agent operates. The "State" (St) refers to a current situation of the agent. Each State (St) may have one or more dimensions that describe the State. The "reward" ($R_1$) is feedback from the environment (also illustrated as "r" in FIG. 4B), which is used to evaluate actions (A) taken by the agent. In other words a reward function, which is part of the environment, generates the reward (Rt), and the reward function reflects the desired goal of the model being trained. The "policy" is a methodology by which to map the State (St) of the agent to certain actions (At). The "value" is a future reward received by an agent by taking an action (At) in a particular State (St). Ultimately, the goal of the agent is to generate actions (A) that maximize the reward function.

Examples of RL algorithms that may be used include Markov decision process (MDP) (i.e., the methodology illustrated in FIG. 4A), Monte Carlo methods, temporal difference learning, Q-learning, Deep Q Networks (DQN), State-Action-Reward-State-Action (SARSA), a distributed cluster-based multi-agent bidding solution (DCMAB), and the like. FIG. 4B illustrates one example of the operation of a DQN model. DQN is a combination of deep learning (i.e., neural network based) and reinforced learning. Deep learning is another subfield of machine learning that involves artificial neural networks. An example of a computer system that employs deep learning is IBM's Watson. While the terms "neural network" and "deep learning" are oftentimes used interchangeably, by popular convention, deep learning (e.g., with a DNN), refers to a neural network with more than three layers inclusive of the inputs and the output. A neural network with just two or three layers is considered just a basic neural network.

A neural network can be seen as a universal functional approximator that can be used to replace the Q-table used in Q-learning. In a DQN model, the loss function 50 is represented as a squared error of the target Q value and prediction Q value. Error is minimized by optimizing the weights, θ. In DQN, two separate networks (i.e., target network 54 and prediction network 56 having the same architecture) can be respectively employed to estimate target and prediction Q values based upon state 52. The result from the target model is treated as a ground truth for the prediction network 56. The weights for the prediction network 56 get updated every iteration and the weights of the target network 54 get updated with the prediction network 56 after N iterations.

Figure 5:
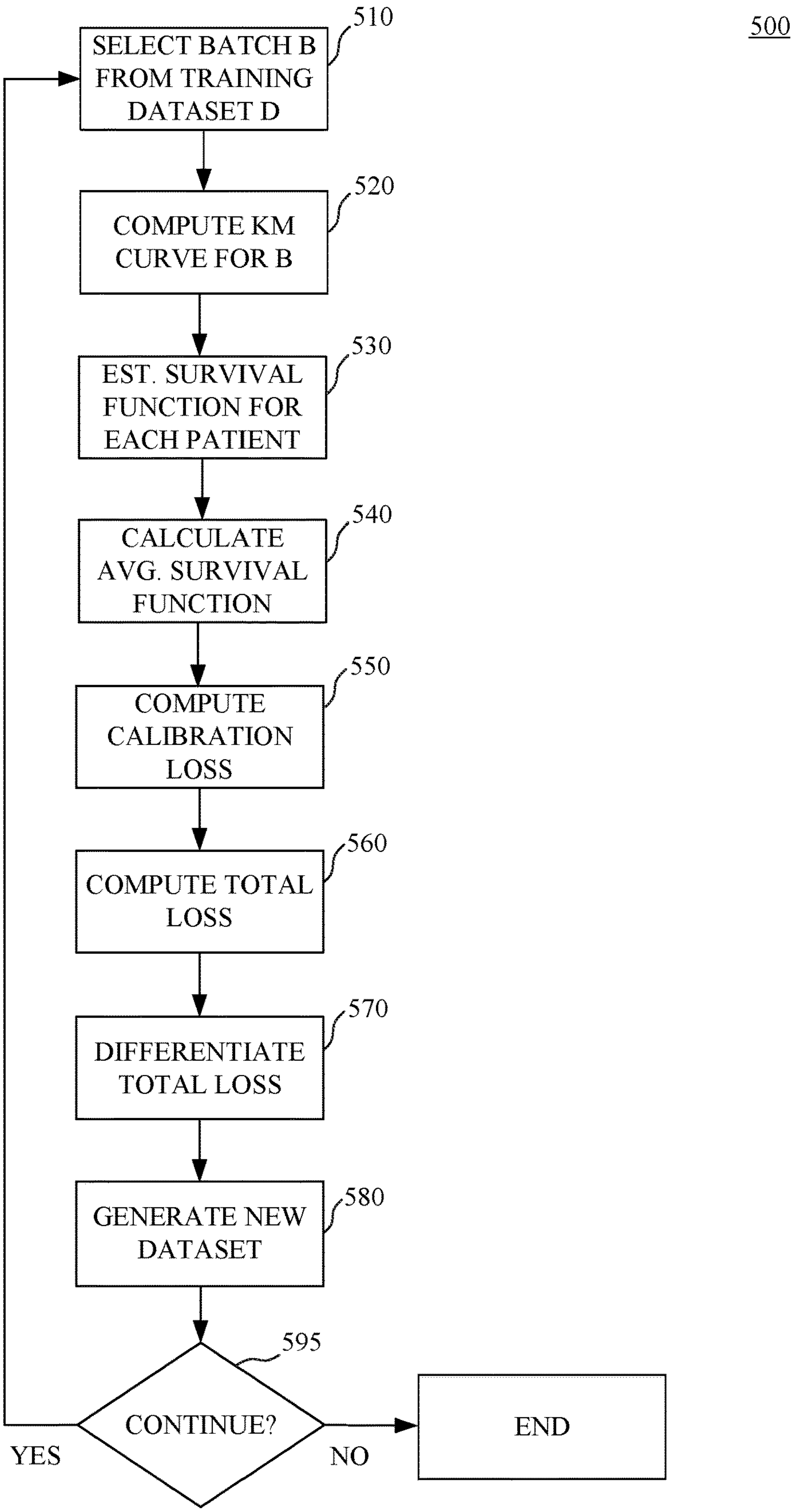
FIG. 5 is a flowchart of an example method for training a neural network prediction model for survival analysis according to an embodiment of the present invention.

FIG. 5 illustrates a methodology 500 for training a neural network having a prediction model for survival analysis according to an aspect of the present disclosure. In 510, a training dataset is divided into a plurality of portions or batches. Although any positive integer can be used as the batch size, in certain aspects, the training dataset (D) can be divided into between 32 and 1024 batches. One of the batches is then randomly selected for subsequent analysis.

In 520, using a non-parametric estimator and the data found in the selected batch (B), a curve k(t) is generated that represents a survival rate of a group of individuals over time. Although not limited in this manner, the non-parametric estimator is a Kaplan-Meier estimator. In 530, using the prediction model of the neural network, a survival function S(t|x) is estimated for each patient X in the batch B. Once a survival function S(t|x) is estimated for all of the patients X in the batch B, in 540, an average survival function S(t) is calculated using the survival functions S(t|x) estimated for all of the patients X, as known to those skilled in the art and can be a simple average.

In 550, a calibration loss l is determined. Although not limited in this manner, calibration loss $$l = \int_0^{tmax} d(S(t), k(t))dt,$$

where tmax is a maximum time of uncensored data points in the dataset, S(t) is the average survival function, k(t) is the curve representing the survival rate of the group of individuals within the batch over the period of time, and d is the distance between S(t) and k(t). In a special case with $d(f,g)=(f-g)^2$, the calibration loss l=

$$\int_0^{tmax} d(S(t), k(t))dt,$$

Figure 6:
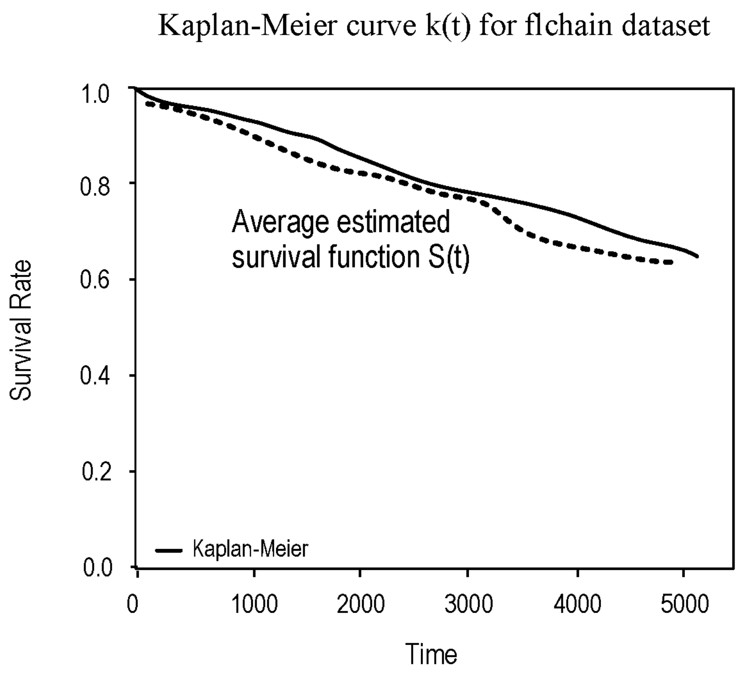
FIG. 6 is a graphical representation of the Kaplan-Meier curve k(t) along with a calculated average estimated survival function S(t).

FIG. 6 is a graphical representation of the Kaplan-Meier curve k(t) along with a calculated average estimated survival function S(t).

In 560, a total loss is calculated as a sum of the calibration loss l and a selected loss function. In X-CAL, for example, the total loss=DRSA (deep recurrent survival analysis)+λ* (regularization term). In certain aspects of the present application, total loss=the selected loss function+λ*(calibration loss l), where the regularization term is the calibration loss l determined in 550. Lambda (λ) is a scalar value that can be changed to tune the overall impact of the regularization term. The selected loss function is not limited as to a particular type of loss function. For example, the selected loss function could employ continuous ranked probability score (CRPS) as part of Survival-CRPS. Other types of loss function that could be employed including regression loss functions such as DRSA.

In 570, the total loss is differentiated to obtain gradients, and in 580, the weights of the prediction model are updated based upon these gradients. The purpose of training prediction model of a neural net is to minimize the loss by adjusting the parameters, such as weights, biases etc. As the loss becomes smaller, the more accurately the true function (i.e., the prediction) is approximated. As known to those skilled in neural networks, gradient descent algorithms are commonly used for loss function optimization. Gradient descent algorithms calculate the first order derivative of each of the parameters with respect to the loss function and determines the particular direction the weights of the prediction model (i.e., parameters) are to be adjusted to reduce the loss. Many types of gradient descent algorithms are known, and the present methodology 500 is not limited as to a particular type. Examples of gradient descent algorithms include Stochastic gradient descent (SGD), batch gradient descent, and mini-batch gradient descent. In certain aspects, the present methodology employs mini-batch gradient descent.

In 595, a determination is made whether to continue to refine the model or to stop. If the determination is made to continue, the methodology 500 loops back to 510, in which another batch is selected from the training dataset. This determination is similar to the determination made in 360/370 of FIG. 3. For example, a determination to end the optimization can be based upon a determination that the loss function has been substantially minimized.

FIGS. 7A-B are tables illustrating calibration metrics (D-CAL and KM (Kaplan-Meier) Loss) and prediction metric (negative log likelihood (NLL)) and concordance index (c-index) using the datasets of FLChain (FIG. 7A) and SUPPORT (FIG. 7B), which are publically-available, clinical survival datasets. These metrics are shown for both X-CAL (right-hand side) and the inventive methodology of the present disclosure (left-hand side)

Concordance index is a standard performance measure for model assessment survival analysis and is a measure of rank correlation between predicted risk scores and observed time points. A higher c-index score represents a better survival model. In NLL, better predictions yield a lower NLL metric, and accordingly, a lower NLL metric is desirable. Lower scores for both D-CAL and KM Loss are also desirable. As illustrated, calibration was achieved by increasing lambda λ for both X-CAL and the methodology of the present disclosure.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 8:
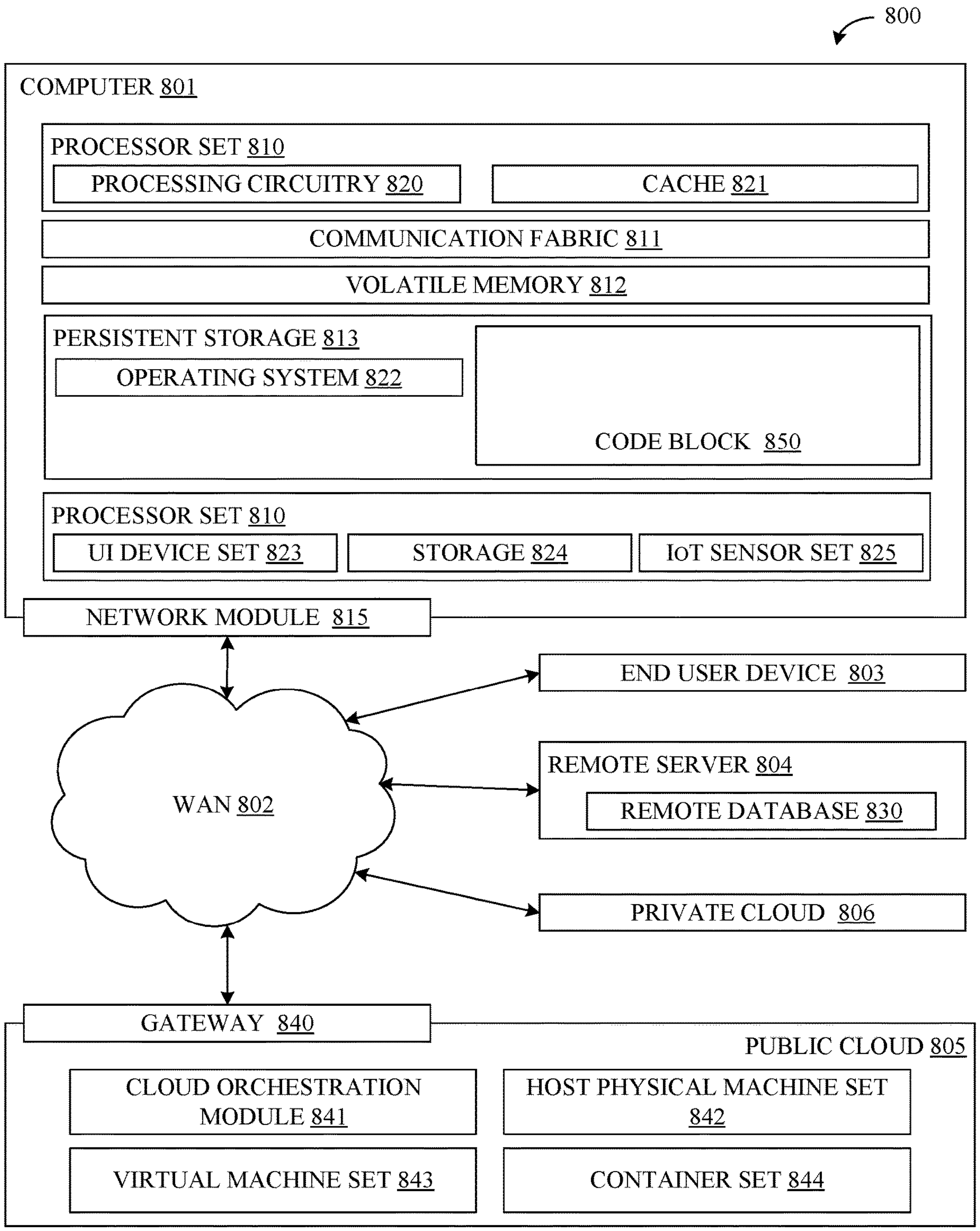
FIG. 8 is a block diagram illustrating an example of computer environment for implementing the methodology of FIG. 5.

Referring to FIG. 8, computing environment 800 contains an example of an environment for the execution of at least some of the computer code involved in performing the inventive methods, such as code block 850 for training a neural network prediction model for survival analysis. Computing environment 800 includes, for example, computer 801, wide area network (WAN) 802, end user device (EUD) 803, remote server 804, public cloud 805, and private cloud 806. In certain aspects, computer 801 includes processor set 810 (including processing circuitry 820 and cache 821), communication fabric 811, volatile memory 812, persistent storage 813 (including operating system 822 and method code block 850), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. However, to simplify this presentation of computing environment 800, detailed discussion is focused on a single computer, specifically computer 801. Computer 801 may or may not be located in a cloud, even though it is not shown in a cloud in FIG. 8 except to any extent as may be affirmatively indicated.

Processor set 810 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In certain computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in code block 850 in persistent storage 813.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 811 is the signal conduction paths that allow the various components of computer 801 to communicate with each other. Typically, this communication fabric 811 is made of switches and electrically conductive paths, such as the switches and electrically conductive paths that make up busses, bridges, physical input/output ports and the like. Other types of signal communication paths may be used for the communication fabric 811, such as fiber optic communication paths and/or wireless communication paths.

Volatile memory 812 is any type of volatile memory now known or to be developed in the future. Examples include dynamic type random access memory (RAM) or static type RAM. Typically, the volatile memory 812 is characterized by random access, but this is not required unless affirmatively indicated. In computer 801, the volatile memory 812 is located in a single package and is internal to computer 801. In addition to alternatively, the volatile memory 812 may be distributed over multiple packages and/or located externally with respect to computer 801.

Persistent storage 813 is any form of non-volatile storage for computers that is now known or to be developed in the future. The non-volatility of the persistent storage 813 means that the stored data is maintained regardless of whether power is being supplied to computer 801 and/or directly to persistent storage 813. Persistent storage 813 may be a read only memory (ROM), but typically at least a portion of the persistent storage 813 allows writing of data, deletion of data and re-writing of data. Some familiar forms of persistent storage 813 include magnetic disks and solid state storage devices. Operating system 822 may take several forms, such as various known proprietary operating systems or open source Portable Operating System Interface type operating systems that employ a kernel. The code included in code block 850 typically includes at least some of the computer code involved in performing the inventive methods.

Peripheral device set 814 includes the set of peripheral devices for computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some aspects, storage 824 may take the form of a quantum computing storage device for storing data in the form of qubits. In aspects where computer 801 is required to have a large amount of storage (for example, where computer 801 locally stores and manages a large database) then this storage 824 may be provided by peripheral storage devices designed for storing very large amounts of data, such as a storage area network (SAN) that is shared by multiple, geographically distributed computers. Internet-of-Things (IoT) sensor set 825 is made up of sensors that can be used in IoT applications. For example, one sensor may be a thermometer and another sensor may be a motion detector.

Network module 815 is the collection of computer software, hardware, and firmware that allows computer 801 to communicate with other computers through a Wide Area Network (WAN) 802. Network module 815 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 815 are performed on the same physical hardware device. In other aspects (for example, aspects that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any Wide Area Network (for example, the internet) capable of communicating computer data over non-local distances by any technology for communicating computer data, now known or to be developed in the future. In some aspects, the WAN 802 may be replaced and/or supplemented by local area networks (LANs) designed to communicate data between devices located in a local area, such as a Wi-Fi network. The WAN 802 and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In certain aspects, EUD 803 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804. As defined herein, the term "server" means a data processing system configured to share services with one or more other data processing systems.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other aspects, a private cloud 806 may be disconnected from the internet entirely (e.g., WAN 802) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method for iteratively training a prediction model for survival analysis, the computer-implemented method comprising:

selecting a batch of data from a training dataset representing a plurality of individuals;

generating, using a non-parametric statistical function and for the batch of data, a curve representing a survival rate of a group of individuals within the batch over a period of time, wherein the plurality of individuals includes the group of individuals;

estimating, using the prediction model, individual survival functions for each individual of the group of individuals within the batch;

generating an average survival function from the individual survival functions;

generating a calibration loss using the average survival function and the curve representing the survival rate; and updating weights of a neural network including the prediction model based upon a total loss including the calibration loss for the iterative training of the prediction model.

2. The computer-implemented method of claim 1, wherein the non-parametric statistical function is a Kaplan-Meier estimator.

3. The computer-implemented method of claim 1, wherein the total loss is a function of the calibration loss and a selected loss function, the total loss is differentiated to obtain gradients, and the weights are updated based upon the gradients.

4. The computer-implemented method of claim 1, wherein the updating of the weights of the neural network is performed for a plurality of batches of the training dataset, and wherein the plurality of batches includes the batch.

5. The computer-implemented method of claim 1, wherein the calibration loss l is calculated as $$l = \int_0^{tmax} d(S(t), k(t))dt,$$

where:

tmax is a maximum time of uncensored data points in the training dataset,

S(t) is the average survival function, k(t) is the curve representing the survival rate of the group of individuals within the batch over the period of time, and d is a distance between S(t) and k(t).

6. The computer-implemented method of claim 1, wherein the prediction model predicts failure occurrence of a particular type of manmade device, and the plurality of individuals corresponds to a plurality of particular type of manmade devices, wherein the plurality of particular type of manmade devices comprises the particular type of manmade device.

7. The computer-implemented method of claim 1, wherein the prediction model predicts mortality of a particular type of biological organism, and the plurality of individuals corresponds to a plurality of particular type of biological organisms, wherein the plurality of particular type of biological organisms comprises the particular type of biological organism.

8. A computer hardware system for iteratively training a prediction model for survival analysis, the computer hardware system comprising:

a hardware processor configured to perform executable operations comprising:

selecting a batch of data from a training dataset representing a plurality of individuals;

generating, using a non-parametric statistical function and for the batch of data, a curve representing a survival rate of a group of individuals within the batch over a period of time, wherein the plurality of individuals includes the group of individuals;

estimating, using the prediction model, individual survival functions for each individual of the group of individuals within the batch;

generating an average survival function from the individual survival functions;

generating a calibration loss using the average survival function and the curve representing the survival rate; and updating weights of a neural network including the prediction model based upon a total loss including the calibration loss for the iterative training of the prediction model.

9. The computer hardware system of claim 8, wherein the non-parametric statistical function is a Kaplan-Meier estimator.

10. The computer hardware system of claim 8, wherein the total loss is a function of the calibration loss and a selected loss function, the total loss is differentiated to obtain gradients, and the weights are updated based upon the gradients.

11. The computer hardware system of claim 8, wherein the updating of the weights of the neural network is performed for a plurality of batches of the training dataset, and wherein the plurality of batches includes the batch.

12. The computer hardware system of claim 8, wherein the calibration loss l is calculated as $$l = \int_0^{tmax} d(S(t), k(t))dt,$$

where:

tmax is a maximum time of uncensored data points in the training dataset,

S(t) is the average survival function, k(t) is the curve representing the survival rate of the group of individuals within the batch over the period of time, and d is a distance between S(t) and k(t).

13. The computer hardware system of claim 8, wherein the prediction model predicts failure occurrence of a particular type of manmade device, and the plurality of individuals corresponds to a plurality of particular type of manmade devices, wherein the plurality of particular type of manmade devices comprises the particular type of manmade device.

14. The computer hardware system of claim 8, wherein the prediction model predicts mortality of a particular type of biological organism, and the plurality of individuals corresponds to a plurality of particular type of biological organisms, wherein the plurality of particular type of biological organisms comprises the particular type of biological organism.

15. A computer program product, comprising:

a computer readable storage medium having stored therein program code for iteratively training a prediction model, the program code, which when executed by a computer hardware system, cause the computer hardware system to perform:

selecting a batch of data from a training dataset representing a plurality of individuals;

generating, using a non-parametric statistical function and for the batch of data, a curve representing a survival rate of a group of individuals within the batch over a period of time, wherein the plurality of individuals includes the group of individuals;

estimating, using the prediction model, individual survival functions for each individual of the group of individuals within the batch;

generating an average survival function from the individual survival functions;

generating a calibration loss using the average survival function and the curve representing the survival rate; and updating weights of a neural network including the prediction model based upon a total loss including the calibration loss for the iterative training of the prediction model.

16. The computer program product of claim 15, wherein the non-parametric statistical function is a Kaplan-Meier estimator.

17. The computer program product of claim 15, wherein the total loss is a function of the calibration loss and a selected loss function, the total loss is differentiated to obtain gradients, and the weights are updated based upon the gradients.

18. The computer program product of claim 15, wherein the calibration loss l is calculated as $$l = \int_0^{tmax} d(S(t), k(t))dt,$$

where:

tmax is a maximum time of uncensored data points in the training dataset,

S(t) is the average survival function, k(t) is the curve representing the survival rate of the group of individuals within the batch over the period of time, and d is a distance between S(t) and k(t).

19. The computer program product of claim 15, wherein the prediction model predicts failure occurrence of a particular type of manmade device, and the plurality of individuals corresponds to a plurality of particular type of manmade devices, wherein the plurality of particular type of manmade devices comprises the particular type of manmade device.

20. The computer program product of claim 15, wherein the prediction model predicts mortality of a particular type of biological organism, and the plurality of individuals corresponds to a plurality of particular type of biological organisms, wherein the plurality of particular type of biological organisms comprises the particular type of biological organism.

* * * * *